(12) United States Patent
Kanehira et al.

(10) Patent No.: US 8,436,823 B2
(45) Date of Patent: May 7, 2013

(54) SENSOR APPARATUS AND INFORMATION PROCESSING APPARATUS

(75) Inventors: Hiroki Kanehira, Miyagi (JP); Ryota Kitamura, Miyagi (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 12/969,818

(22) Filed: Dec. 16, 2010

(65) Prior Publication Data

US 2011/0148811 A1    Jun. 23, 2011

(30) Foreign Application Priority Data

Dec. 22, 2009  (JP) ................. P2009-291255

(51) Int. Cl.
*G06F 3/041*  (2006.01)

(52) U.S. Cl.
USPC ......... 345/173; 345/174; 345/178; 178/18.06

(58) Field of Classification Search ................. 345/156, 345/174, 176, 173
See application file for complete search history.

(56) References Cited

U.S. PATENT DOCUMENTS

| 5,854,881 | A  | * | 12/1998 | Yoshida et al. | ............... | 345/104 |
| 8,169,416 | B2 | * | 5/2012  | Han            | ............... | 345/173 |
| 2001/0024194 | A1 | * | 9/2001 | Shigetaka et al. | ............ | 345/173 |

FOREIGN PATENT DOCUMENTS

JP    2009-134473    6/2009

* cited by examiner

*Primary Examiner* — Amare Mengistu
*Assistant Examiner* — Gloryvid Figueroa-Gibson
(74) *Attorney, Agent, or Firm* — K&L Gates LLP

(57) ABSTRACT

A sensor apparatus includes a first capacitance element, a second capacitance element, a ground circuit, and a signal processing circuit. The first capacitance element has a first capacitance. The second capacitance element includes a first electrode and a second electrode that form a second capacitance larger than the first capacitance. The ground circuit includes a third electrode arranged adjacently to the first electrode, and converts the second capacitance into a third capacitance smaller than the second capacitance by connecting the third electrode to a ground potential. The signal processing circuit processes a first signal output from the first capacitance element based on a change of the first capacitance, and a second signal output from the second capacitance element based on a change of the third capacitance.

10 Claims, 14 Drawing Sheets

SENSOR APPARATUS AND INFORMATION PROCESSING APPARATUS

CROSS REFERENCES TO RELATED APPLICATIONS

The present application claims priority to Japanese Priority Patent Application JP 2009-291255 filed in the Japan Patent Office on Dec. 22, 2009, the entire content of which is hereby incorporated by reference.

BACKGROUND

The present application relates to a sensor apparatus that detects a contact position and a pressing force of an operator with respect to an input operation surface, and an information processing apparatus equipped with the sensor apparatus.

In recent years, portable information processing apparatuses typified by cellular phones are being made multifunctional, and the structure in which a display unit provided to a casing is caused to function as a user interface is proposed. For example, Japanese Patent Application Laid-open No. 2009-134473 discloses an electronic apparatus including a touch panel that detects an input operation position with respect to a display unit, and a press detection sensor that detects an input operation force.

SUMMARY

Incidentally, in order to simplify the structure and reduce the cost of development, it is desirable to process signals output from various types of sensors in a common circuit. For example, it is conceivable that a detection element that detects an operation position and a detection element that detects an operation force are each constituted of a capacitance-type capacitance element and accordingly share a circuit that processes signals output from those capacitance elements.

However, in a case where the two capacitance elements has capacitances largely different from each other, output ranges of signals output from the respective elements are also largely different from each other, which makes it difficult to process the signals of the respective elements in a common circuit. Therefore, in this case, the inconvenience is caused. For example, the structure of a capacitance element to be used is restricted, or the detection accuracy is lowered.

In view of the circumstances as described above, it is desirable to provide a sensor apparatus and an information processing apparatus that are capable of detecting outputs of a plurality of capacitance elements having different capacitances in a common circuit.

According to an embodiment, there is provided a sensor apparatus including a first capacitance element, a second capacitance element, a ground circuit, and a signal processing circuit.

The first capacitance element has a first capacitance.

The second capacitance element includes a first electrode and a second electrode that form a second capacitance larger than the first capacitance.

The ground circuit includes a third electrode arranged adjacently to the first electrode, and converts the second capacitance into a third capacitance smaller than the second capacitance by connecting the third electrode to a ground potential.

The signal processing circuit processes a first signal output from the first capacitance element based on a change of the first capacitance, and a second signal output from the second capacitance element based on a change of the third capacitance.

In the sensor apparatus, the ground circuit connects the third electrode located adjacently to the first electrode to the ground potential, thus electrostatically coupling the first electrode and the third electrode. At this time, a capacitance between the first and second electrodes (third capacitance) becomes smaller than a capacitance of the case where the third electrode is not connected to the ground potential (second capacitance). Therefore, even when the second capacitance element has a capacitance larger than that of the first capacitance element, the capacitance of the second capacitance element can be made smaller with the ground circuit. Accordingly, it is possible to detect outputs of two capacitance elements having different capacitances with use of a common signal processing circuit.

As the third capacitance takes a value closer to that of the first capacitance, the difference with the first capacitance can be made smaller. The difference between the third capacitance and the first capacitance is not particularly limited, but it may be in an adjustable range of the signal processing circuit.

The third capacitance is determined based on the magnitude of the capacitance between the first electrode and the third electrode. Therefore, it is possible to set the third capacitance to a desired value based on a relative positional relationship between the first electrode and the third electrode, including a distance between both the electrodes. Further, the third electrode is not limited to a single electrode, and may be constituted of a plurality of electrodes.

The structure of the signal processing circuit is not particularly limited, and an appropriate structure corresponding to the structure of each capacitance element, the principle of detection, or the like can be adopted. For example, based on an output change of alternating current (including high frequency and wave pulse) applied to the capacitance element, a capacitance change of the capacitance element may be detected. The signal processing circuit is not limited to the case of being constituted of a single processing circuit, and may be constituted of a plurality of circuits. Further, the signal processing circuit may be an analog circuit, a digital circuit, or a combination of those circuits.

The first capacitance element may include an input operation surface operated by an operator. In this case, the first signal may include a signal for detecting a contact position of the operator with respect to the input operation surface, and the second signal may include a signal for detecting a pressing force of the operator with respect to the input operation surface.

As described above, the operation modes of the operator to be detected in the respective capacitance elements are made different from each other, with the result that it is possible to detect a three-dimensional input operation using the operator, with high precision.

The first capacitance element may include a plurality of first detection electrodes extending in a first direction, and a plurality of second detection electrodes that extend in a second direction crossing the first direction and are opposed to the plurality of first detection electrodes. The plurality of first detection electrodes and the plurality of second detection electrodes form capacitance elements each having the first capacitance in a plurality of areas in which the first and second detection electrodes cross each other. Accordingly, a contact or a proximity position of the operator with respect to the input operation surface can be detected by the first capacitance element.

In this case, the ground circuit may include a switch circuit. The switch circuit forms the third electrode by connecting one of the plurality of first detection electrodes and the plurality of second detection electrodes to the ground potential.

With this structure, some electrodes of the first capacitance element can be caused to function as the third electrodes. Further, the first capacitance element and the ground circuit can share a part of the structures thereof, with the result that the sensor apparatus can be downsized and the structure thereof can be simplified.

The switch circuit may include a first switch and a second switch. The first switch has a first state in which an input of the first signal to the signal processing circuit is blocked. The second switch has a second state in which the second signal is allowed to be input to the signal processing circuit when the first switch is in the first state.

The first switch and the second switch select input of the first and second signals with respect to the signal processing circuit. Accordingly, the signal processing on the first signal and the signal processing on the second signal can be performed in a single signal processing circuit.

The first switch may connect one of the plurality of first detection electrodes and the plurality of second detection electrodes to the ground potential in the first state.

With this structure, the conversion from the second capacitance to the third capacitance by the ground circuit can be synchronized with the processing of an output signal (second signal) from the second capacitance element based on the change of the third capacitance.

The sensor apparatus may further include a casing to accommodate the first capacitance element. In this case, the first electrode is fixed to the first capacitance element, and the second electrode is fixed to the casing.

With this structure, a relative positional change of the first capacitance element with respect to the casing can be detected as a change of a capacitance between the first and second electrodes.

In this case, the first electrode is arranged in a circumference of the first capacitance element, with the result that a relative positional change of the first capacitance element with respect to the casing can be detected with high precision by the second capacitance element.

Further, the second capacitance element may further include an elastic member arranged between the first electrode and the second electrode. With this structure, the pressing force with respect to the input operation surface can be elastically supported by the elastic member.

The sensor apparatus may further include a display element to display an image on the input operation surface.

The image may be an icon selected and operated by a user, or may be an image displayed based on an input operation made by the user. With this structure, the input operation surface can be caused to function as a GUI (Graphical User Interface).

According to another embodiment, there is provided an information processing apparatus including a first capacitance element, a second capacitance element, a ground circuit, a signal processing circuit, and a display element.

The first capacitance element includes an input operation surface operated by an operator and has a first capacitance.

The second capacitance element includes a first electrode and a second electrode that form a second capacitance larger than the first capacitance.

The ground circuit includes a third electrode arranged adjacently to the first electrode, and converts the second capacitance into a third capacitance smaller than the second capacitance by connecting the third electrode to a ground potential.

The signal processing circuit processes a first signal and a second signal. The first signal is a signal for detecting a contact position of the operator with respect to the input operation surface, and is output from the first capacitance element based on a change of the first capacitance. The second signal is a signal for detecting a pressing force of the operator with respect to the input operation surface, and is output from the second capacitance element based on a change of the third capacitance.

The display element displays an image on the input operation surface.

According to the an embodiment, with use of the common signal processing circuit, it is possible to process outputs of a plurality of capacitance elements having different capacitances in a common circuit.

Additional features and advantages are described herein, and will be apparent from the following Detailed Description and the figures.

DETAILED DESCRIPTION

Embodiments of the present application will be described below in detail with reference to the drawings.

First Embodiment

[Overall Structure]

Figure 1:
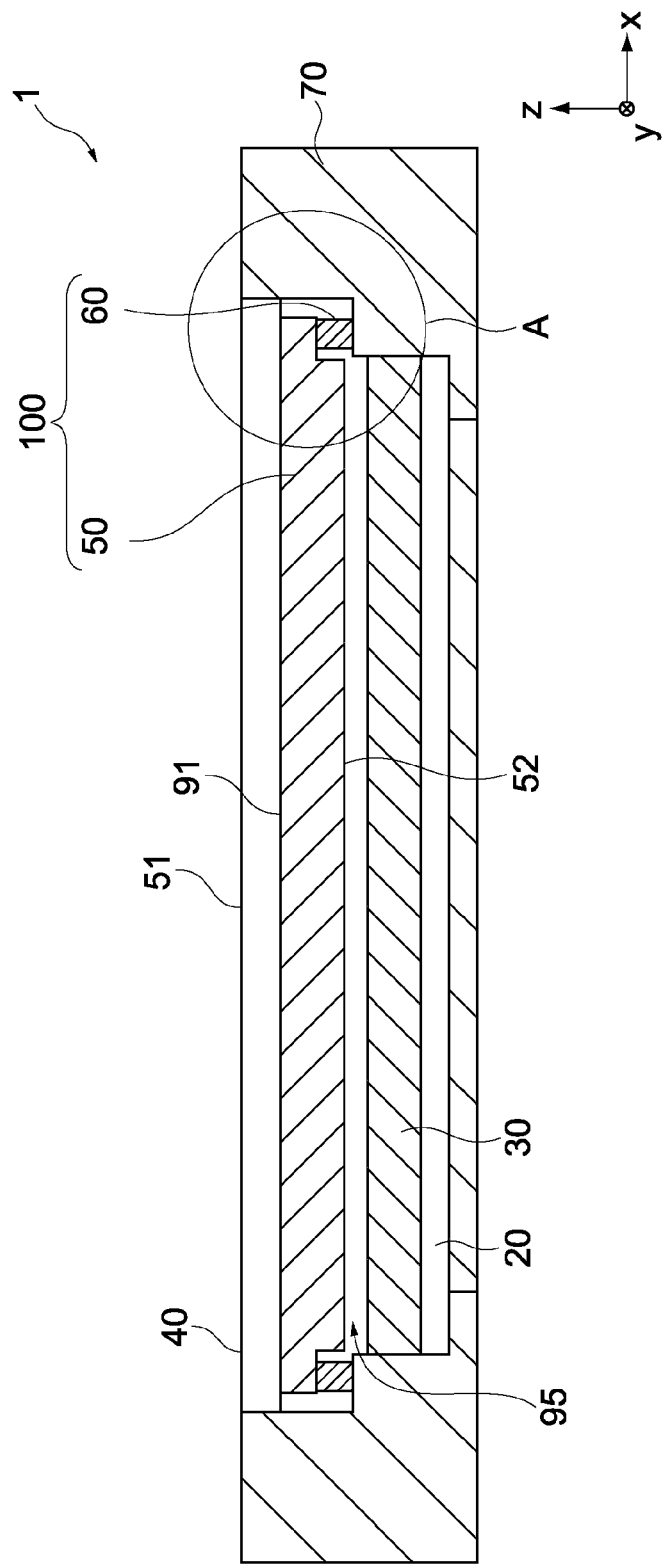
FIG. 1 is a schematic cross-sectional view showing an information processing apparatus including a sensor apparatus according to an embodiment.
Figure 2:
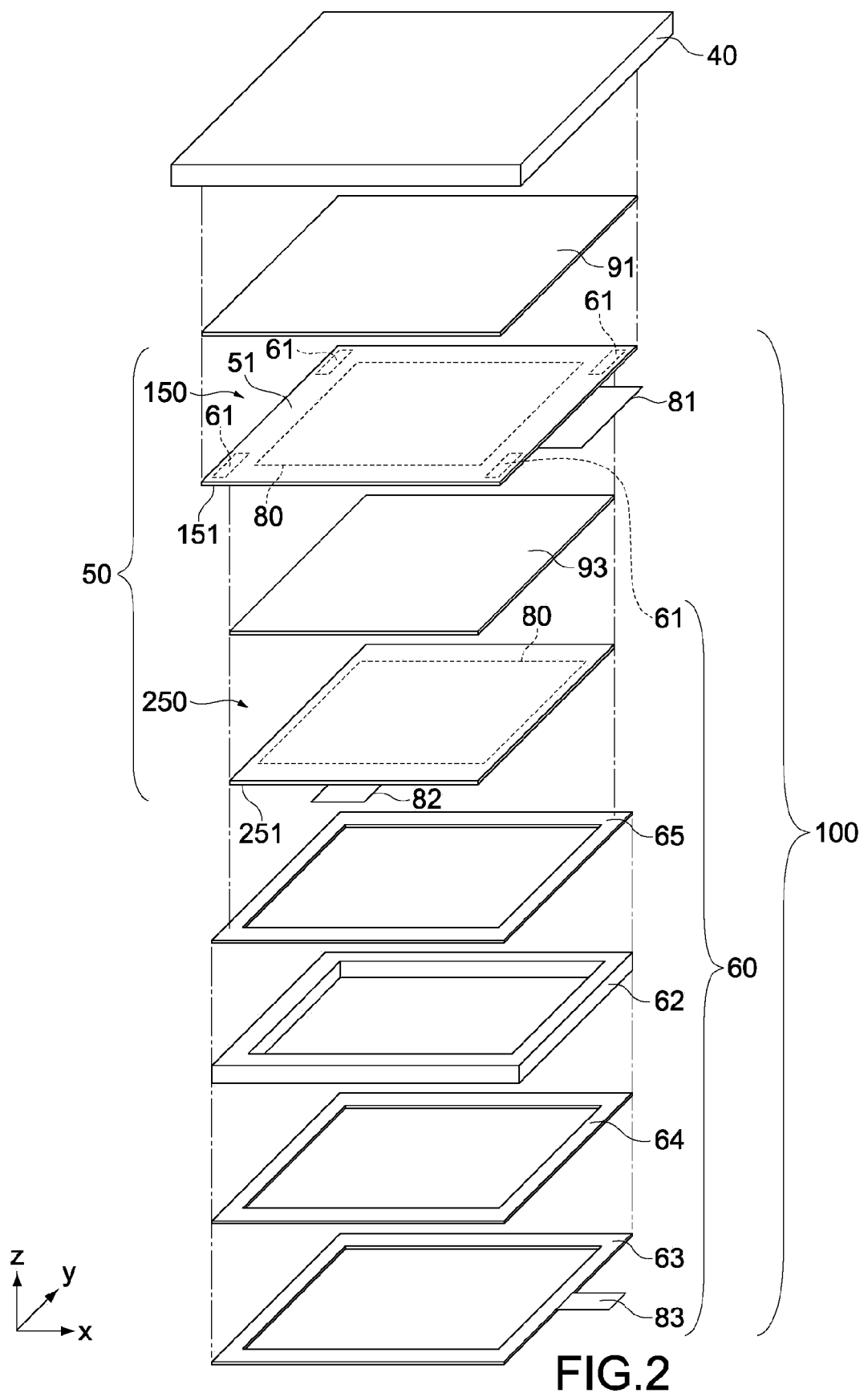
FIG. 2 is a schematic exploded perspective view of the information processing apparatus, in which a casing is not illustrated.
Figure 3:
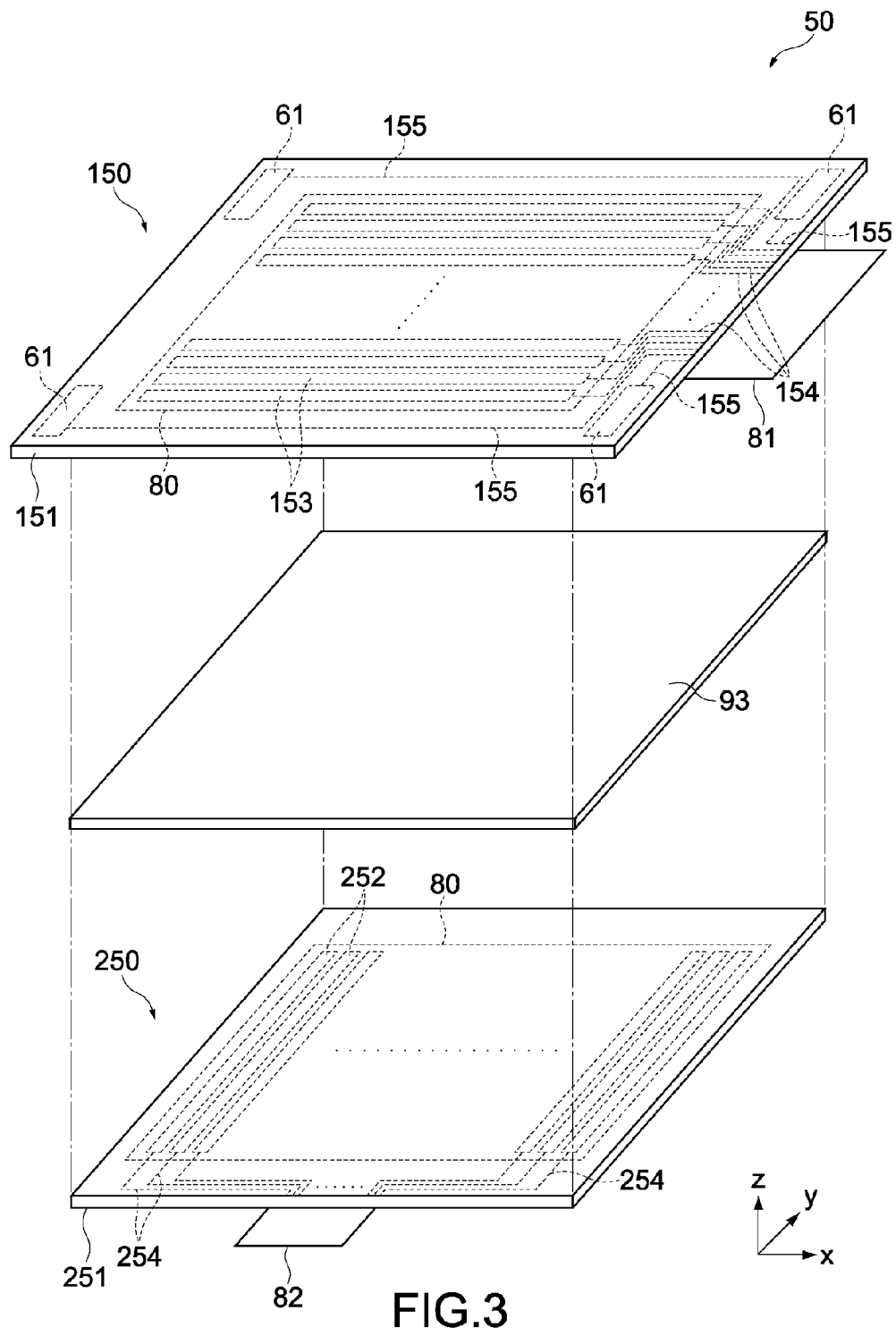
FIG. 3 is an enlarged view of a main portion of the information processing apparatus.
Figure 4:
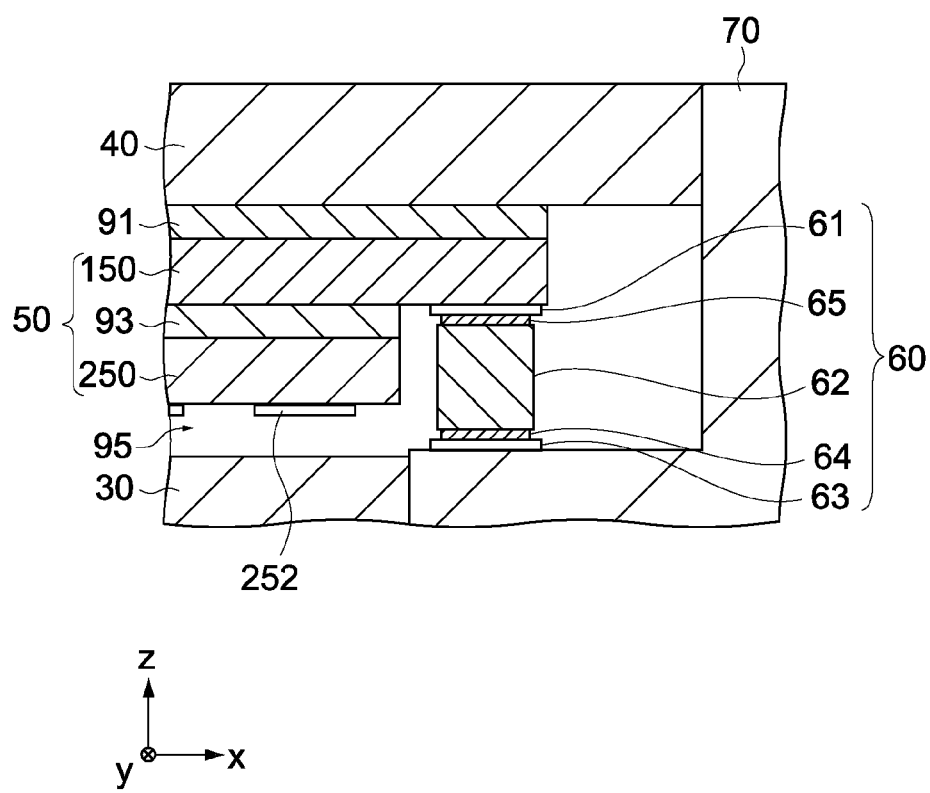
FIG. 4 is an enlarged view of an area surrounded by the circle A of FIG. 1.
Figure 5:
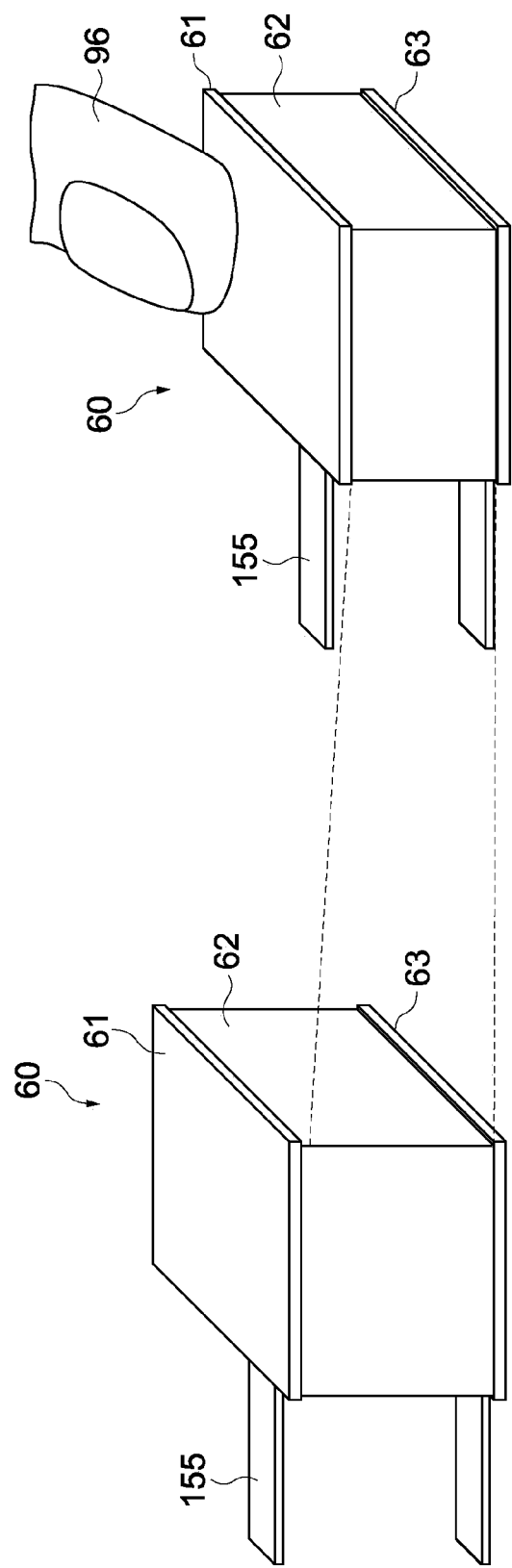
FIG. 5 is a diagram for explaining the principle of operation of a pressure-sensitive sensor incorporated in the information processing apparatus.
Figure 6:
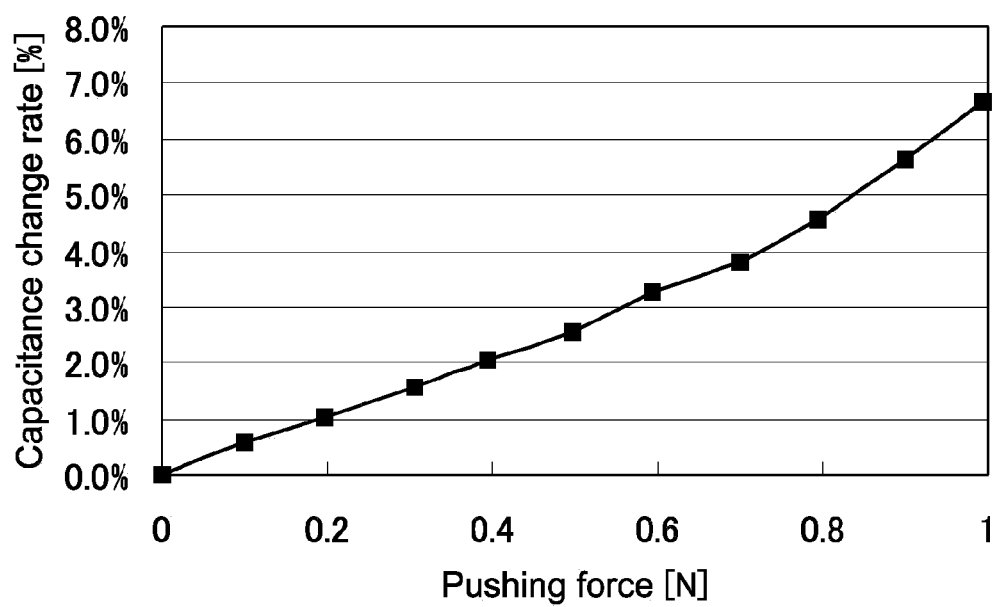
FIG. 6 is a diagram showing an example of characteristics of the pressure-sensitive sensor shown in FIG. 5.

FIG. 1 is a schematic cross-sectional view showing an information processing apparatus including a sensor apparatus according to an embodiment. FIG. 2 is a schematic exploded perspective view of the information processing apparatus shown in FIG. 1, in which a casing is not illustrated. FIG. 3 is a partially enlarged view of FIG. 2, and corresponds to an exploded perspective view of a touch panel. In FIG. 2, an electrode structure of the touch panel is partially omitted for easy understanding of the drawing, and the detailed electrode structure of the touch panel is shown in FIG. 3. FIG. 4 is an enlarged view of an area surrounded by the circle A of FIG. 1. FIG. 5 is a diagram for explaining the principle of operation of a pressure-sensitive sensor incorporated in the information processing apparatus shown in FIG. 1. FIG. 6 is a diagram showing an example of characteristics of the pressure-sensitive sensor shown in FIG. 5. In the figures, for easy understanding of the structures, the structures are illustrated at a scale different from the actual scale, and the number of wires or the like is also different from the actual number.

As shown in FIGS. 1 to 4, an information processing apparatus 1 includes a top plate 40, a sensor unit 100, a liquid crystal panel 30 as a display element, a backlight 20 that irradiates the liquid crystal panel 30 with light, and a casing 70 that accommodates those above components. In the information processing apparatus 1, the top plate 40, the sensor unit 100, the liquid crystal panel 30, and the backlight 20 are arranged in the stated order when viewed from a user side. The sensor unit 100 includes a touch panel 50 as a first capacitance element, and a pressure-sensitive sensor 60 as a second capacitance element.

The top plate 40 is for protecting the surface of the touch panel 50 located below the top plate 40, but the top plate 40 may be omitted. For the top plate 40, a transparent glass substrate or film may be used. The surface of the top plate 40 serves as an input operation surface 51 with which an input operator such as a finger and a stylus comes into contact when a user makes an input operation. Hereinafter, a finger is exemplified as an input operator.

The top plate 40 and the sensor unit 100 are bonded and fixed to each other by the bonding layer 91. The sensor unit 100 includes the touch panel 50 having a flat rectangular shape, and the pressure-sensitive sensor 60, which are bonded and fixed to each other. In this embodiment, the top plate 40 is structured as a part of the touch panel 50.

The touch panel 50 has the input operation surface 51 and a second surface 52 located on the liquid crystal panel 30 side opposite thereto. The pressure-sensitive sensor 60 is arranged in the circumference of the touch panel 50. In this embodiment, four pressure-sensitive sensors 60 are arranged one by one at four corners of a frame portion of the second surface 52 of the touch panel 50. The touch panel 50 is arranged on the top plate 40 side, and the pressure-sensitive sensors 60 are arranged on the liquid crystal panel 30 side. The liquid crystal panel 30 is arranged on a back surface side of the touch panel 50. In this embodiment, the operator comes close to or comes into contact with (hereinafter, collectively referred to as "contact") the input operation surface 51, and thus an input operation with respect to the information processing apparatus 1 is made.

The pressure-sensitive sensor 60 is fixedly arranged to the casing 70. The pressure-sensitive sensor 60 includes an elastic body 62, and an upper electrode 61 and a lower electrode 63 that are arranged so as to interpose the elastic body 62 therebetween. When the input operation surface 51 is pressed in a direction perpendicular to the input operation surface 51 (z-axis direction in the figures), the elastic body 62 of the pressure-sensitive sensor 60 is deformed so as to be contracted, and the touch panel 50 and the top plate 40 to which the pressure-sensitive sensor 60 is bonded and fixed are moved in the press direction at the same time. In this way, the pressure-sensitive sensor 60 has a structure in which a thickness thereof is changed in the z-axis direction when pressed. Therefore, the touch panel 50 is moved so as to come close to the liquid crystal panel 30 by an amount of deformation of the pressure-sensitive sensor 60 that is caused by the press with the finger. In consideration of the movement amount, a gap 95 is provided between the sensor unit 100 and the liquid crystal panel 30.

[Touch Panel]

The touch panel 50 is a capacitance-type input device that detects xy coordinates on the input operation surface 51. In the capacitance-type touch panel 50, by detecting a part in which a capacitance is locally changed, it is possible to detect a position of the input operation surface of the touch panel with which a finger of a user has come into contact, and this change in position.

As shown in FIGS. 2 and 3, the touch panel 50 is structured by, for example, sequentially laminating an X electrode substrate 150 and a Y electrode substrate 250 and bonding each other by a bonding layer 93. The X electrode substrate 150 and the Y electrode substrate 250 each have a rectangular shape, and in this embodiment, the Y electrode substrate 250 has an outer shape smaller than that of the X electrode substrate 150. An area in which X-direction detection electrodes 153 formed on the X electrode substrate 150 and Y-direction detection electrodes 252 formed on the Y electrode substrate 250 overlap each other in plan view becomes an xy-plane coordinate detection area 80. The pressure-sensitive sensor 60 is arranged in a circumferential area (frame portion) outside the xy-plane coordinate detection area 80 of the touch panel 50. In other words, a portion of the X electrode substrate 150 that protrudes from the Y electrode substrate 250 has a frame shape in plan view, and the pressure-sensitive sensor 60 is provided in this protruding portion.

In FIGS. 2 and 3, electrode patterns and the like formed on the X electrode substrate 150 and the Y electrode substrate 250 are arranged on back surface sides of the substrates in the figures, and therefore the electrode patterns are indicated by dotted lines.

The X electrode substrate 150 includes a transparent polyimide substrate 151, the X-direction detection electrodes 153 formed on the transparent polyimide substrate 151, the upper electrodes 61, wires 154 electrically connected to the X-direction detection electrodes 153, and lead wires 155 electrically connected to the upper electrodes 61. A PET film substrate, a glass substrate, or the like may be used in addition to the transparent polyimide substrate 151.

The X-direction detection electrodes 153 are each formed of a stripe-shaped transparent conductive film, for example, ITO (Indium Tin Oxide), extending in the X-axis direction in the figures. The upper electrodes 61 constitute a part of the pressure-sensitive sensor 60. The upper electrodes 61 are formed simultaneously with the X-direction detection electrodes 153, and are formed of ITO. The upper electrodes 61 are four in total, and arranged one by one at four corners on the frame portion of the rectangular touch panel 50 outside the coordinate detection area 80. The four upper electrodes 61 are electrically independent from each other. The wires 154 are wires for electrically connecting the X-direction detection electrodes 153 and a circuit substrate (not shown) via an FPC substrate 81. The lead wires 155 are wires for electrically connecting the upper electrodes 61 and the circuit substrate (not shown) via the FPC substrate 81. The wires 154 and the lead wires 155 are formed by printing with Ag (silver), for example. It should be noted that the upper electrodes 61 may be formed simultaneously with the wires 154 and the lead wires 155, by printing with Ag or the like.

The Y electrode substrate 250 includes a transparent polyimide substrate 251, the Y-direction detection electrodes 252 formed on the transparent polyimide substrate 251, and wires 254 electrically connected to the Y-direction detection electrodes 252. A PET film substrate, a glass substrate, or the like may be used in addition to the transparent polyimide substrate 251.

The Y-direction detection electrodes 252 are each formed of a stripe-shaped transparent conductive film, for example, ITO (Indium Tin Oxide), extending in the Y-axis direction in the figures. The wires 254 are wires for electrically connecting the Y-direction detection electrodes 252 and a circuit substrate (not shown) via an FPC substrate 82. The wires 254 are formed by printing with Ag (silver), for example. The circuit substrate is arranged, for example, on a surface side of the backlight 20, opposite to the side on which the liquid crystal panel 30 is arranged.

As described above, the touch panel 50 has a structure in which the electrode patterns for detection are provided in the biaxial directions orthogonal to each other. A detection output of the touch panel 50 (first signal) is input to a detection circuit provided on the circuit substrate (not shown), and a position on the biaxial plane, that is, xy coordinates are specified. A predetermined voltage is applied to each of the X-direction detection electrodes 153 and Y-direction detection electrodes 252, and electric charge is formed between the X-direction detection electrodes 153 and the Y-direction detection electrodes 252. The electric charge is changed due to the contact of the finger, and current flowing through each of the X-direction detection electrodes and Y-direction detection electrodes changes. When this change is detected, xy coordinates can be specified and the position of the finger is detected. It should be noted that when the top plate 40 is not provided, the surface of the X electrode substrate 150 on which the electrode patterns are not arranged serves as an input operation surface.

[Pressure-Sensitive Sensor]

As shown in FIGS. 1 to 4, the pressure-sensitive sensor 60 includes the elastic body 62, the upper electrode 61, and the lower electrode 63. The elastic body 62 is formed of a dielectric material and arranged between the touch panel 50 and the casing 70. The upper electrode 61 and the lower electrode 63 are arranged to interpose the elastic body 62 therebetween. The pressure-sensitive sensor 60 further includes a bonding layer 65 and a bonding layer 64. The bonding layer 65 bonds and fixes the elastic body 62 to the upper electrode 61. The bonding layer 64 bonds and fixes the elastic body 62 to the lower electrode 63. In this embodiment, elastic bodies constituting the four pressure-sensitive sensors 60 are coupled to each other to constitute one frame-shaped elastic body 62, and the four pressure-sensitive sensors 60 share one elastic body 62. Further, lower electrodes constituting the four pressure-sensitive sensors 60 are couples to each other to constitute one frame-shaped lower electrode 63, and the four pressure-sensitive sensors 60 share one lower electrode 63. It should be noted that the upper electrode 61 may also be formed into a frame shape similarly to the lower electrode 63.

For the elastic body 62, for example, a material causing less residual distortion and a high restoration rate (restoration speed) is used. As materials of this type, for example, a silicone rubber or a urethane rubber can be used. In this embodiment, as the elastic body 62, "PORON" (registered trademark) manufactured by INOAC CORPORATION is used.

The elastic body 62 may be deformed by about 10%, for example. In a case where an elastic body 62 having a thickness of, for example, 0.5 mm is used, the deformation may be about 50 μm. In this embodiment, the elastic body 62 is provided in a frame shape (annular shape) in conformity with the frame portion of the touch panel 50. Since the elastic body 62 is provided in a frame shape, it is possible to prevent dust or the like from entering between the touch panel 50 and the casing 70, specifically, the gap 95 between the touch panel 50 and the liquid crystal panel 30 from the outside, in the state of the information processing apparatus 1. In this manner, the frame-shaped elastic body 62 can be given a sealing function of preventing the entry of dust from the outside. Therefore, there is no influence on display characteristics due to the entry of dust from the outside.

As described above, the upper electrodes 61 are formed on the touch panel 50 simultaneously with the X-direction detection electrodes 153 or wires 154. Accordingly, it is unnecessary to form the upper electrodes 61 in other steps. In addition, since the upper electrodes 61 constituting a part of the pressure-sensitive sensor 60, and the X-direction transparent electrode patterns and wires formed on the touch panel 50 can be formed on the same substrate, those electrodes and the like can be collectively wired on the same FPC substrate 81.

The lower electrode 63 is formed by, for example, printing a conductive paste on the casing 70. For the lower electrode 63, for example, a silver paste can be used. The lower electrode 63 is arranged in a frame shape (annular shape) in conformity with the frame portion of the touch panel 50, as in the case of the elastic body 62. The lower electrode 63 is electrically connected to the circuit substrate (not shown) via the FPC substrate 83. The lower electrode 63 is shared by the plurality of pressure-sensitive sensors 60, with the result that the wiring of the lower electrode 63 can be made simple.

[Principle of Operation of Pressure-Sensitive Sensor]

Next, the principle of operation of the pressure-sensitive sensor 60 in this embodiment will be described with reference to FIGS. 5 and 6. In the pressure-sensitive sensor 60 in this embodiment, a capacitance is changed in accordance with a pressing force applied with a finger 96 in the lamination direction of the upper electrode 61, the elastic body 62, and the lower electrode 63 of the pressure-sensitive sensor 60. As shown in the right-side illustration of FIG. 5, when the finger 96 applies a pressing force to the pressure-sensitive sensor 60, the elastic body 62 constituting the pressure-sensitive sensor 60 is distorted such that a thickness thereof is reduced, and a capacitance between the upper electrode 61 and the lower electrode 63 is reduced.

As described above, the pressure-sensitive function is realized using the capacitance change between the electrodes 61 and 63 due to the deformation of the elastic body 62. As shown in FIG. 6, the pressure-sensitive sensor 60 has linear characteristics in which a capacitance change rate is substantially proportional to a pushing force, that is, a pressing force applied to the pressure-sensitive sensor 60. In this embodiment, a rectangular pulse is applied to the lower electrode 63, a signal obtained from the upper electrode (second signal) is input to a computing circuit provided on the circuit substrate (not shown), and the capacitance change between the electrodes 61 and 63 can be detected. Then, from the capacitance change between the electrodes 61 and 63, it is possible to judge that an input determination operation made by pressing the input operation surface 51 has been made.

The pressing force applied to the input operation surface 51 based on the capacitance change of the pressure-sensitive sensor 60 is judged by a judgment unit including a computing circuit 7 to be described later. The judgment unit can be structured as a part of a controller of the information processing apparatus 1. The judgment unit judges the pressing force based on the capacitance change detected by the pressure-sensitive sensors 60 arranged at the four corners of the touch panel 50. As will be described later, the judgment unit may judge the pressing force based on a combined value of the capacitance changes of the respective pressure-sensitive sensors 60. Accordingly, the highly precise detection of the pressing force without depending on a press position on the input operation surface is enabled. In this case, for example, the judgment unit may judge the pressing force from the combined value of the capacitance changes, or judge the pressing force from an average value obtained by dividing the combined value by the number of pressure-sensitive sensors.

In the sensor unit 100, when the input operation surface 51 is touched with the finger 96, a coordinate position on the xy plane is detected by the touch panel 50. Then, when the input operation surface 51 is pressed with the finger 96, a pressing force applied toward a direction perpendicular to the xy plane (z-axis direction) is detected by the pressure-sensitive sensor 60, and an input determination is judged. As a result, merely an indirect contact of the finger 96 with the input operation surface 51 is not judged as determination, with the result that incorrect inputs can be reduced. In addition, since the finger 96 can be moved on the input operation surface 51 while touching the input operation surface 51, the operability is excellent.

[Signal Processing Circuit]

Figure 7:
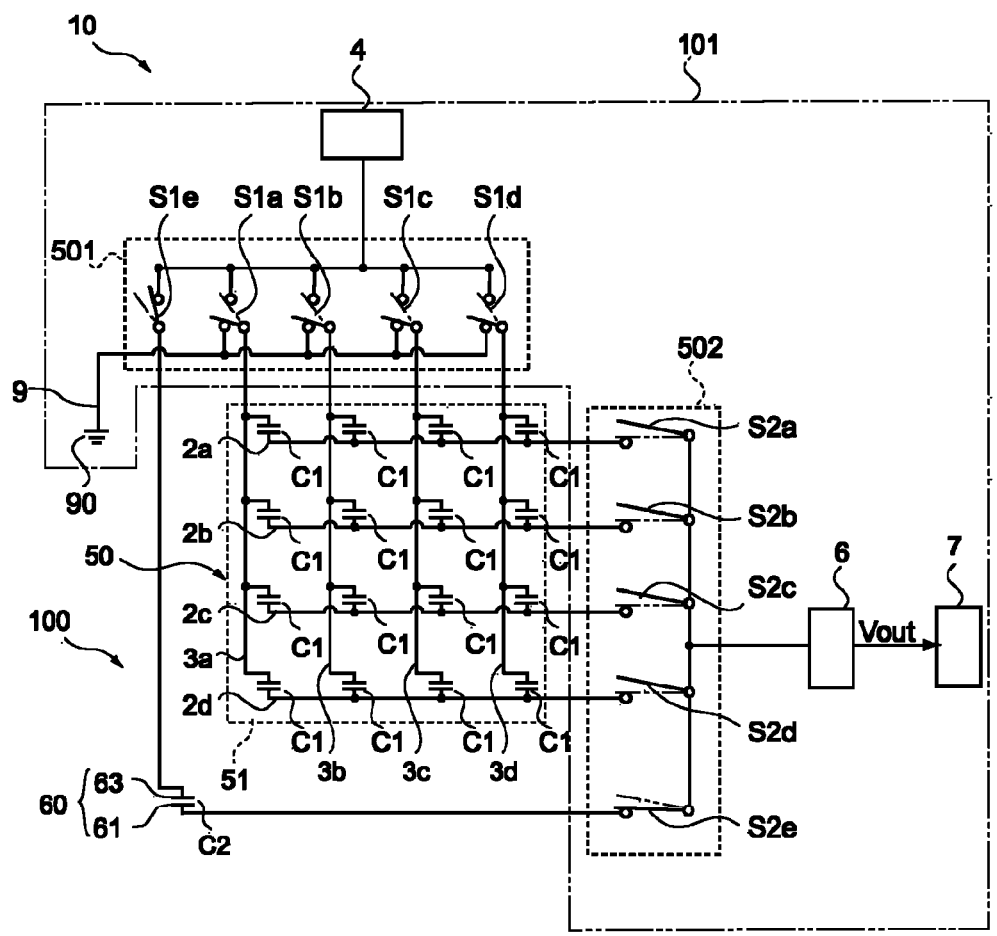
FIG. 7 is a circuit diagram showing a structural example of the sensor apparatus incorporated in the information processing apparatus.
Figure 8:
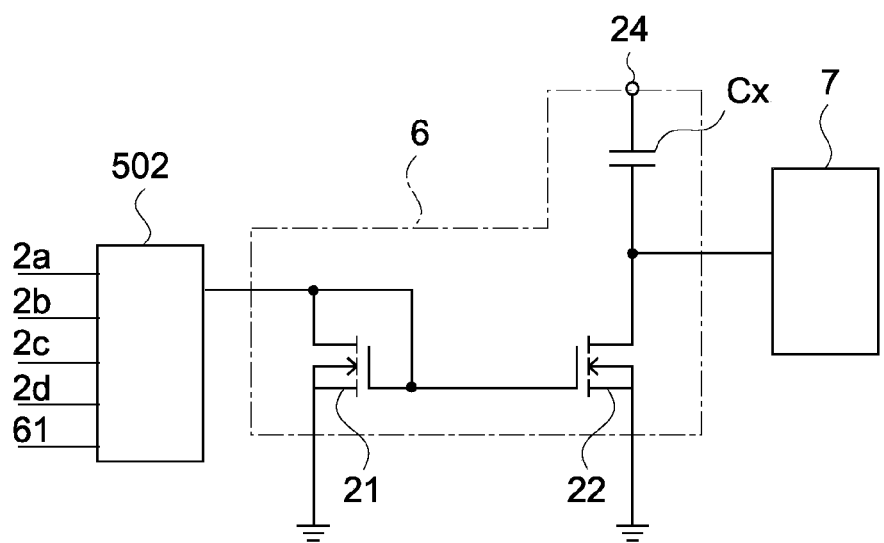
FIG. 8 is a circuit diagram showing a structural example of a main portion of the sensor apparatus.

Next, a signal processing circuit will be described. The signal processing circuit generates and processes a first signal and a second signal that are output from the touch panel 50 and the pressure-sensitive sensor 60 described above, respectively. FIG. 7 is a schematic structural diagram showing a structural example of a signal processing circuit 101. FIG. 8 is a circuit diagram showing a structure example of a detection circuit constituting a part of the signal processing circuit 101. In addition, the sensor unit 100 and the signal processing circuit 101 constitute a sensor apparatus 10 according to this embodiment.

As shown in FIG. 7, the sensor apparatus 10 includes the touch panel 50, the pressure-sensitive sensor 60, a signal generation circuit 4, a first switch circuit 501, a second switch circuit 502, a detection circuit 6, and a computing circuit 7. The touch panel 50 includes X-direction detection electrodes 2a, 2b, 2c, and 2d and Y-direction detection electrodes 3a, 3b, 3c, and 3d. The pressure-sensitive sensor 60 includes the upper electrode 61 and the lower electrode 63. The X-direction detection electrodes 2a to 2d correspond to the detection electrodes 153 described above, and the Y-direction detection electrodes 3a to 3d correspond to the detection electrodes 252 described above. For easy understanding, four X-direction detection electrodes 2a to 2d and four Y-direction detection electrodes 3a to 3d are shown in FIG. 7.

The X-direction detection electrodes 2a to 2d and the Y-direction detection electrodes 3a to 3d are arranged so as to cross each other on the input operation surface 51 when viewed from the Z direction, and do not come into contact with each other. Accordingly, at a plurality of points at which the X-direction detection electrodes 2a to 2d and the Y-direction detection electrodes 3a to 3d cross each other, formed are first capacitors C1 in each of which the detection electrode 2a, 2b, 2c, or 2d is opposed to one of the detection electrodes 3a to 3d. The touch panel 50 is connected between the first switch circuit 501 and the second switch circuit 502.

The pressure-sensitive sensor 60 forms a second capacitor C2 by the upper electrode 61 and the lower electrode 63. The pressure-sensitive sensor 60 is connected between the first switch circuit 501 and the second switch circuit 502.

The signal generation circuit 4 is connected to the switch circuit 501, and generates an input signal to be supplied to the Y-direction detection electrodes 3a to 3d via the switch circuit 501. In this embodiment, the signal generation circuit 4 generates a pulse-shaped input signal, but an input signal may be other periodic signals such as sign waves, other than pulses.

The first switch circuit 501 is connected to the Y-direction detection electrodes 3a to 3d and the lower electrode 63 of the pressure-sensitive sensor 60. The first switch circuit 501 includes switches S1a, S1b, S1c, S1d, and S1e that supply a signal generated in the signal generation circuit 4 to the Y-direction detection electrodes 3a, 3b, 3c, 3d and the lower electrode 63, respectively. The switch circuit 501 opens/closes the switches S1a to S1e, thus connecting the signal generation circuit 4 to one of the Y-direction detection electrodes 3a, 3b, 3c, 3d or lower electrode 63. The switch circuit 501 flips the switches S1a to S1e sequentially at a predetermined timing. Here, the switches S1a to S1e are flipped in the order of the detection electrode 3a, the detection electrode 3b, the detection electrode 3c, the detection electrode 3d, and the lower electrode 63. As a result, an input signal from the signal generation circuit 4 is periodically supplied to the individual first capacitors C1 constituting the touch panel 50 and the second capacitor C2 constituting the pressure-sensitive sensor 60 in a sequential manner.

Further, the first switch circuit 501 is connected to a ground potential (GND) 90. The first switch circuit 501 is structured so that the Y-direction detection electrodes 3a to 3d are connectable to the ground potential (GND) 90 via the switches S1a to S1d. In this embodiment, as shown in FIG. 7, when the switch S1e is on state, the individual Y-direction detection electrodes 3a to 3d are connected to the ground potential 90.

The second switch circuit 502 is connected to the X-direction detection electrodes 2a to 2d and the upper electrode 61 of the pressure-sensitive sensor 60. The second switch circuit 502 includes switches S2a, S2b, S2c, S2d (referred to as first switches) and S2e (referred to as second switch) that output electric signals supplied via the capacitors C1 and C2, to the detection circuit 6. The switch circuit 502 opens/closes the switches S2a to S2e, thus connecting one of the X-direction detection electrodes 2a and 2d or upper electrode 61 to the detection circuit 6. The switch circuit 502 flips the switches S2a to S2e sequentially at a predetermined timing. Here, when one of the switches S1a to S1d is turned on, one of the switches S2a to S2d is turned on. In addition, when the switch S1e is turned on, the switches S2a to S2d are turned off and the switch S2e is turned on. In this manner, output signals from the capacitors C1 constituting the touch panel 50 and the capacitor C2 constituting the pressure-sensitive sensor 60 are periodically supplied to the detection circuit 6 in a sequential manner.

Next, the structure of the detection circuit 6 will be described. FIG. 8 is a circuit diagram showing a structural example of the detection circuit 6. It should be noted that the structure of the detection circuit 6 is not limited to the structure to be described below.

The detection circuit 6 includes n-channel FETs (Field effect transistors), i.e., an FET 21 and an FET 22, and a reference capacitor Cx. A source of the FET 21 is grounded and a gate and a drain thereof are connected to the X-direction detection electrodes 2a to 2d via the switch circuit 502. The gate of the FET 21 is also connected to a gate of the FET 22. A source of the FET 22 is grounded and a drain thereof is connected to a power supply terminal (Vdd) 24 via the reference capacitor Cx. The drain of the FET 22 is also connected to the computing circuit 7. In the detection circuit 6 with the structure described above, a current mirror circuit is formed by the FET 21 and the FET 22. In other words, current that is proportional to a drain-source current of the FET 21 flows between the drain and the source of the FET 22.

With a common input signal, the capacitors C1 and C2 each output a current signal whose magnitude differs based on a magnitude of each capacitance. The detection circuit 6 outputs a detection signal (Vout) corresponding to the change in capacitance of the capacitors C1 and C2 based on the change in current output from the capacitors C1 and C2, to the computing circuit 7.

The computing circuit 7 is constituted of an MPU (Micro Processing Unit) and the like. The computing circuit 7 computes the output signal from the detection circuit 6, and specifies an operation position of the finger 96 with respect to the input operation surface 51, based on the changes in capacitance of the capacitors C1 constituting the touch panel 50. The computing circuit 7 outputs the specified operation position (xy coordinate values) to an operation target device (not shown).

In the detection circuit 6, the reference capacitor Cx is charged by the power supply terminal 24 and a charging voltage (Vout) thereof is output to the computing circuit 7. When the output signal of the touch panel 50 or the pressure-sensitive sensor 60 (first or second signal) is supplied from the second switch circuit 502 to the detection circuit 6, the current is amplified in the current mirror circuit and charged in the reference capacitor Cx. As a result, the potential of a terminal of the reference capacitor Cx on the detection side is gradually increased, and an output voltage (Vout) to the computing circuit 7 is gradually decreased. A reduction rate of the output voltage (Vout) differs based on the magnitude of the current input to the detection circuit 6. The computing circuit 7 detects the change in capacitance of the capacitors C1 and C2 based on an output value of the voltage Vout, a reduction rate of the output value (time change rate), or the like.

For example, as to the capacitors C1 constituting the touch panel 50, a capacitance of a capacitor C1 located substantially immediately below the finger 96 differs between when the finger 96 comes into contact with the input operation surface 51 and when it does not come into contact therewith. In other words, because the finger 96 can be regarded as earth (ground), a detection electrode that comes close to the finger 96 is electrostatically coupled to the finger 96, and thus a capacitance between the detection electrode and a detection electrode opposed thereto is decreased. Therefore, when the finger comes close, a capacitance of the capacitor C1 becomes small as compared to a case where a finger does not come close. Consequently, impedance of a circuit connecting the signal generation circuit 4 and the detection circuit 6 is increased, and current supplied to the detection circuit 6 is decreased. Accordingly, the output voltage (Vout) supplied from the detection circuit 6 to the computing circuit 7 is gently reduced, and the reduction of the capacitance of the capacitor C1 is then detected in the computing circuit 7. The computing circuit 7 detects the capacitance change described above individually for all the capacitors C1 constituting the touch panel 50.

On the other hand, as to the capacitor C2 constituting the pressure-sensitive sensor 60, a capacitance differs between when the input operation surface 51 is pressed and when it is not pressed. In other words, as compared to a case where a pressing force is not applied to the input operation surface 51, a distance between the upper electrode 61 and the lower electrode 63 becomes shorter when the pressing force is applied thereto. Therefore, a capacitance of the capacitor C2 is increased. Consequently, the impedance of the circuit connecting the signal generation circuit 4 and the detection circuit 6 is decreased, and current supplied to the detection circuit 6 is increased. Accordingly, the output voltage (Vout) supplied from the detection circuit 6 to the computing circuit 7 is sharply reduced, and the increase of the capacitance of the capacitor C2 is detected in the computing circuit 7.

Further, in accordance with the magnitude of the pressing force with respect to the input operation surface 51, the capacitance of the capacitor C2 is also continuously changed. As a result, an amount of current input to the detection circuit 6 is also changed in accordance with the capacitance change of the capacitor C2, with the result that the pressing force with respect to the input operation surface 51 can be detected in the computing circuit 7.

[Ground Circuit]

The sensor apparatus 10 of this embodiment detects an input operation based on a difference between capacitances (initial capacitances) of the touch panel 50 and pressure-sensitive sensor 60 at a time when the finger 96 does not come into contact with or press the input operation surface 51, and capacitances thereof at a time when the finger 96 comes into contact with the input operation surface 51 or presses it. When an initial capacitance of the touch panel 50 and that of the pressure-sensitive sensor 60 are different from each other, an output range of a signal output from the touch panel 50 to the detection circuit 6 and an output range of a signal output from the pressure-sensitive sensor 60 to the detection circuit 6 are largely different from each other. In this case, it becomes difficult to use a common reference capacitor Cx in the detection circuit 6, and necessary to prepare a reference capacitor for the touch panel 50 and that for the pressure-sensitive sensor 60, the reference capacitors having different capacitance values.

Particularly, the capacitor C2 constituting the pressure-sensitive sensor 60 has a large opposing area of the electrodes as compared to the individual capacitors C1 constituting the touch panel. Therefore, a capacitance of the capacitor C2 (second capacitance) tends to be larger than a capacitance of the capacitor C1 (first capacitance), and the problems described above become prominent.

In this regard, the sensor apparatus 10 of this embodiment includes a ground circuit 9 that relieves a difference between the initial capacitance of the touch panel 50 and the initial capacitance of the pressure-sensitive sensor 60.

The ground circuit 9 of this embodiment includes the Y-direction detection electrodes 3a to 3d of the touch panel 50, and the switches S1a to S1d that connects those Y-direction detection electrodes 3a to 3d to the ground potential 90. As described above, in the first switch circuit 501, the switches S1a to S1d are flipped to the ground potential 90 when an input signal is applied from the signal generation circuit 4 to the pressure-sensitive sensor 60, and the Y-direction detection electrodes 3a to 3d each function as a ground electrode (third electrode) connected to the ground potential.

On the other hand, since the lower electrode 63 of the pressure-sensitive sensor 60 is arranged close to the Y-direction detection electrodes 252 (3a to 3d) as shown in FIG. 4, the lower electrode 63 is apt to be electrostatically coupled to the Y-direction detection electrodes 3a to 3d connected to the ground potential. As a result, a capacitance of the capacitor C2 formed between the lower electrode 63 and the upper electrode 61 of the pressure-sensitive sensor 60 is converted into a small capacitance (third capacitance) when the Y-direction detection electrodes 3a to 3d are connected to the ground potential, as compared to a case where the Y-direction detection electrodes 3a to 3d are not connected to the ground potential. As a result, the difference in capacitance between the two capacitors C1 and C2 becomes small, and thus the capacitance detection using a common reference capacitor Cx can be realized in the detection circuit 6.

The conversion amount of the capacitance of the capacitor C2 can be adjusted as appropriate in accordance with the distance between the lower electrode 63 and the Y-direction detection electrodes 3a to 3d, and the like. Further, although all the Y-direction detection electrodes 3a to 3d are connected to the ground potential in this embodiment, some of those electrodes or only an electrode closest to the lower electrode 63 may be connected to the ground potential so as to convert the capacitance of the capacitor C2. In addition, instead of the case where the Y-direction detection electrodes 3a to 3d are caused to function as ground electrodes, the X-direction detection electrodes 2a to 2d may be caused to function as ground electrodes so as to convert the capacitance of the capacitor C2. In this case, the second switch circuit 502 can be structured such that the X-direction detection electrodes 2a to 2d are connected to the ground potential when an input signal is applied to the pressure-sensitive sensor 60.

The inventors of the present application used a capacitor C10 having a predetermined electrode area and electrode distance in the pressure-sensitive sensor 60, to measure a capacitance change of the capacitor C10 due to the presence and absence of the ground electrode. Measurement conditions were set as a case where both the X- and Y-direction detection electrodes are not connected to the ground potential (case 1), a case where only the X-direction detection electrodes are connected to the ground potential (case 2), and a case where only the Y-direction detection electrodes are connected to the ground potential (case 3). As a result of the measurement, a capacitance of 15.5 [pF] was obtained in case 1, a capacitance of 13.0 [pF] in case 2, and a capacitance of 9.7 [pF] in case 3, and it was confirmed that the capacitance of the pressure-sensitive sensor 60 is largely changed in accordance with the presence or absence of the ground electrode, the position of the ground electrode, and the like.

Figure 9A:
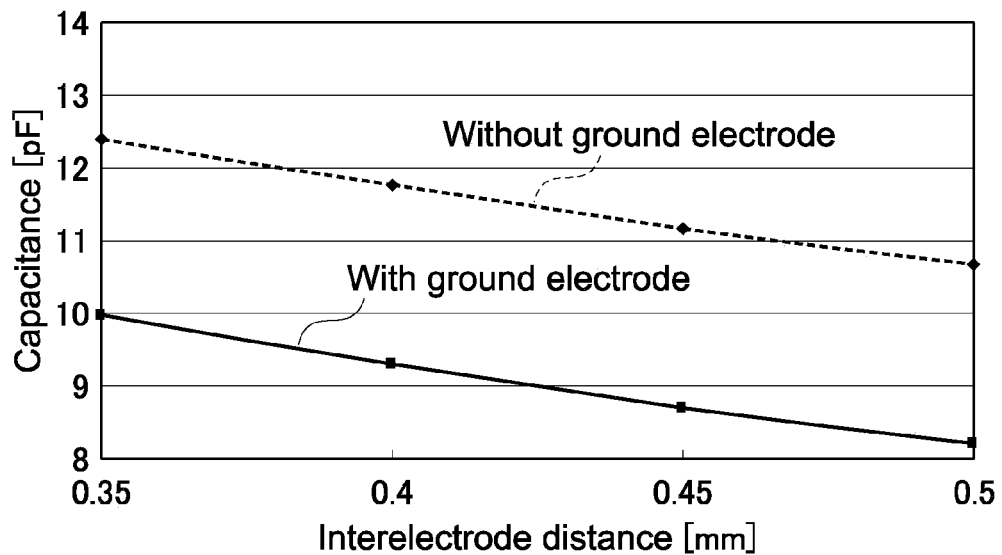
FIG. 9 are diagrams for explaining examples of operation characteristics of the pressure-sensitive sensor.
Figure 9B:
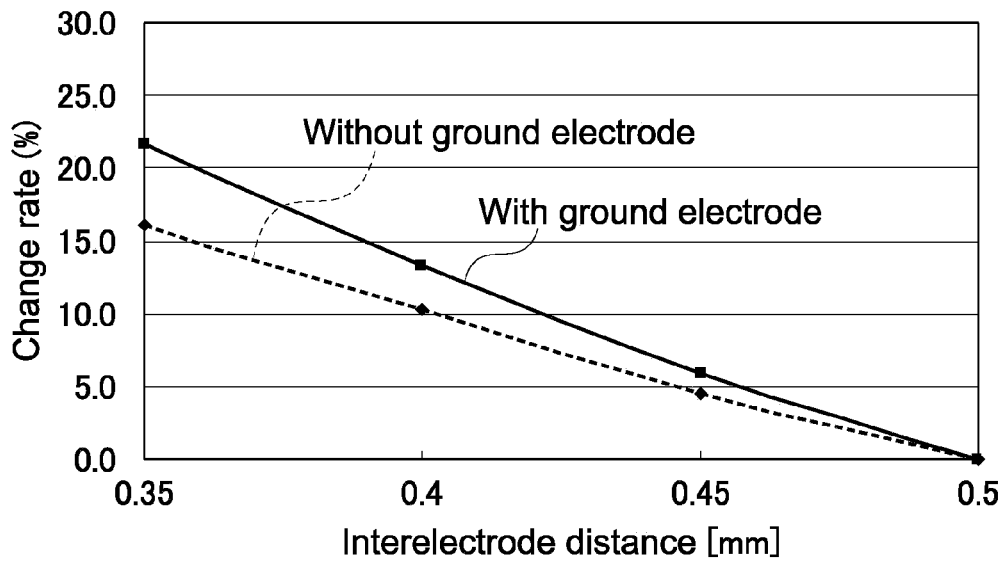

Further, another capacitor C20 different from the capacitor C10 was used as a pressure-sensitive sensor 60, to thereby measure a relationship among an interelectrode distance of the capacitor C20, a capacitance thereof, and a capacitance change rate, for each of the case 1 (without ground electrode) and the case 3 (with ground electrode). The measurement results are shown in FIGS. 9A and 9B. As shown in FIG. 9A, it is found that an initial capacitance of the capacitor C20 differs between when the ground electrode is provided and when it is not provided, and a capacitance is increased in accordance with the decrease of the interelectrode distance. However, in terms of the change rate of capacitance, as shown in FIG. 9B, the change rate of capacitance is large when the ground electrode is provided, as compared to a case where the ground electrode is not provided. In other words, it is shown that the change rate of capacitance with respect to the change in interelectrode distance is high as an initial capacitance value is smaller. As described above, when the capacitance of the pressure-sensitive sensor is decreased using the ground electrode, a capacitance change rate of the pressure-sensitive sensor is increased, with the result that a capacitance change of the pressure-sensitive sensor can be detected with high precision.

It is ideal that the capacitance of the capacitor C2 that is converted by the ground electrode is set to the same value as that of the capacitance of the capacitor C1, but not limited thereto. The capacitance of the capacitor C2 may be a value close to the capacitance of the capacitor C1. Specifically, the difference between the capacitance of the capacitor C1 and the capacitance of the capacitor C2 obtained after the conversion only has to be in an adjustable range of the reference capacitor Cx of the detection circuit 6.

As described above, the signal processing circuit 101 is structured. The signal processing circuit 101 may be constituted of a single processing circuit, or may be constituted of a plurality of circuits. In addition, the signal processing circuit 101 may be constituted of an analog circuit, a digital circuit, or a combination of those circuits.

[Operation of Information Processing Apparatus]

Next, an operation example of the information processing apparatus 1 of this embodiment will be described.

When the information processing apparatus 1 is in a standby state for input of information to the input operation surface 51, an input signal generated in the signal generation circuit 4 is sequentially applied to the Y-direction detection electrodes 3a to 3d of the touch panel 50 and the lower electrode 63 of the pressure-sensitive sensor 60 via the first switch circuit 501. The input operation surface 51 functions as a GUI (Graphical User Interface) by an image of the liquid crystal panel 30 being displayed. The displayed image may be an icon selected and operated by a user, or may be an image displayed based on an input operation made by the user.

During the sequential input of the input signal to the Y-direction detection electrodes 3a to 3d, a current signal output from each capacitor C1 is sequentially supplied to the detection circuit 6 via the second switch circuit 502. A scanning method of the capacitor C1 is not particularly limited. For example, when the switch S1a is on state (state in which a signal is input to the Y-direction detection electrode 3a), the switches S2a to S2d are sequentially flipped at a predetermined measurement period. Next, the switch S1b is tuned on, and the switches S2a to S2d are flipped again. Hereinafter, the same control is also performed on the switch S1c and the switch S1d. Accordingly, an input signal is applied to the capacitors C1 in dot sequence, and an output signal from each capacitor C1 is supplied to the detection circuit 6 in dot sequence.

After an on-operation with respect to the switch S1d is terminated, the switch S1e is turned on, and an input signal is applied to the lower electrode 63 of the pressure-sensitive sensor 60. In synchronization with the on-operation of the switch S1e, the other switches S1a to S1d of the switch circuit 501 are connected to the ground potential 90. Then, the switches S2a to S2d of the switch circuit 502 are turned off, and the switch S2e is turned on. Accordingly, all the Y-direction detection electrodes 3a to 3d are switched to the ground electrode, and an output current from the capacitor C2 in which the capacitance is converted by the electrostatic coupling to the ground electrode is supplied to the detection circuit 6.

By the repetition of the operation described above, an output of each capacitor C1 constituting the touch panel 50 and an output of the capacitor C2 constituting the pressure-sensitive sensor 60 are alternately supplied to the detection circuit 6 by one signal processing circuit 101. The detection circuit 6 sequentially outputs a voltage (Vout) corresponding to the capacitance of the capacitors C1 and C2 to the computing circuit 7.

The computing circuit 7 monitors the capacitance changes of the capacitors C1 and C2 based on the output voltage (Vout) of the detection circuit 6. When the finger 96 does not come into contact with the input operation surface 51, the capacitance of the capacitors C1 and the capacitance of the capacitor C2, which are output from the detection circuit, are constant. On the other hand, when the finger 96 comes into contact with the input operation surface 51, the capacitance of the capacitor C1 in the vicinity of that contact position is decreased. The computing circuit 7 electrically detects the decrease of the capacitance of the capacitor C1 via the detection circuit 6, to specify the operation position on the input operation surface 51.

Further, along with a press operation made by the finger 96 on the input operation surface 51, the capacitance of the capacitor C2 increases in accordance with the press amount. The computing circuit 7 electrically detects the increase of the capacitance of the capacitor C2 via the detection circuit 6, to specify the press operation force with respect to the input operation surface 51. The pressure-sensitive sensor 60 is arranged in the circumference of the touch panel 50, with the result that a change in relative position of the touch panel 50 with respect to the casing 70 can be detected with high precision. In addition, since the touch panel 50 is installed in the casing 70 via the pressure-sensitive sensor 60, the pressing force applied to the input operation surface 51 can be elastically supported by the pressure-sensitive sensor 60 and the operability can be improved.

As described above, according to the information processing apparatus 1 of this embodiment, since the ground circuit 9 that converts the capacitance of the capacitor C2 constituting the pressure-sensitive sensor 60 into a smaller capacitance is provided, it is possible to supply a signal having an output range matched to a capacitance of the reference capacitor Cx of the detection circuit 6 to the detection circuit 6. Accordingly, it is possible to detect a three-dimensional input operation with respect to the input operation surface 51 with high precision.

Further, according to this embodiment, since the second switch circuit 502 is provided, a detection circuit for the touch panel 50 can also be used as a detection circuit for the pressure-sensitive sensor 60. Accordingly, it is possible to process output signals from two types of capacitance elements having different capacitances, in a common circuit, and to make the structure of the signal processing circuit 101 simple and reduce the cost of development.

Furthermore, according to this embodiment, since the Y-direction detection electrodes 3a to 3d constituting the touch panel 50 are used as ground electrodes for converting the capacitance of the capacitor C2, it is possible to make the sensor apparatus 10 downsized and make the structure thereof simple.

Second Embodiment

Figure 10:
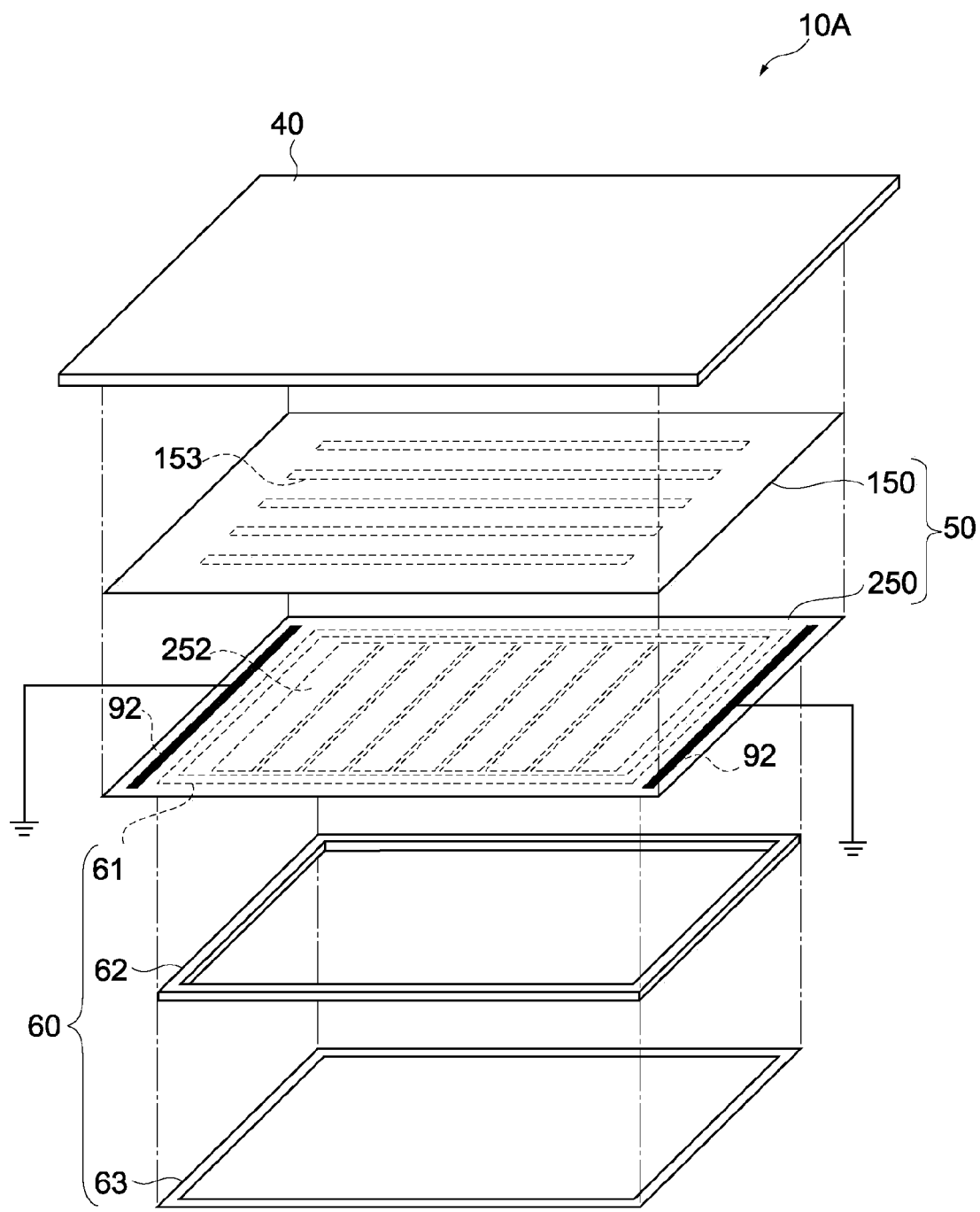
FIG. 10 is an exploded perspective view schematically showing a sensor apparatus according to another embodiment.

FIG. 10 is an exploded perspective view of a sensor apparatus according to another embodiment. A sensor apparatus 10A of this embodiment includes ground electrodes 92 (third electrodes) that are formed on a Y electrode substrate 250 constituting a touch panel 50 and are used for converting a capacitance of a pressure-sensitive sensor 60 into a smaller capacitance. In the example of FIG. 10, the ground electrodes 92 are arranged close to upper electrodes 61 in parallel to Y-direction detection electrodes 252 on both sides of the Y electrode substrate 250. The ground electrodes 92 form a ground circuit by being constantly connected to the ground potential.

The structure of the ground electrode 92 is not limited to the above example, and may be a structure in which a capacitance of the pressure-sensitive sensor 60 can be converted into a target capacitance value. For example, the ground electrodes 92 may be formed on one side of the Y electrode substrate 250, or formed along the circumference of the Y electrode substrate 250 continuously or intermittently in an annular manner.

According to this embodiment, since the ground electrodes are constantly connected to the ground potential, it is unnecessary to connect the Y-direction detection electrodes 252 of the touch panel 50 to the ground potential when an output of the pressure-sensitive sensor 60 is detected. Accordingly, the structure of the first switch circuit 501 shown in FIG. 7 can be made simpler.

Figure 11A:
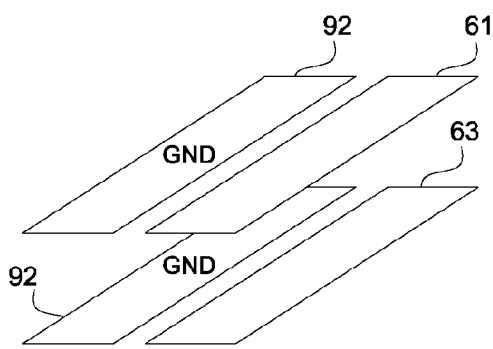
FIG. 11 are schematic diagrams for explaining modified examples of an arrangement relationship of various electrodes shown in FIG. 10.
Figure 11B:
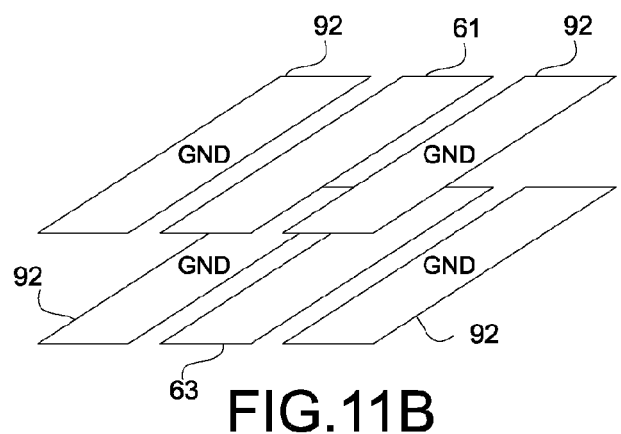
Figure 11C:
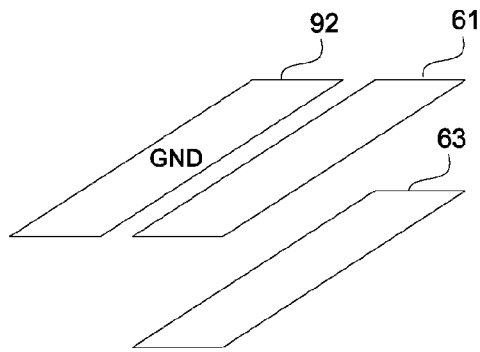
Figure 11D:
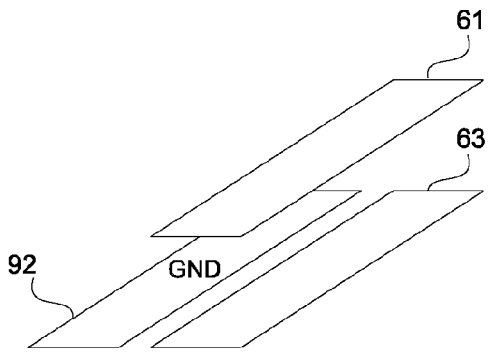

The ground electrodes 92 may be formed on the casing 70, for example, though not limited to the case where the ground electrodes 92 are formed on the electrode substrate constituting the touch panel 50. Arrangement examples of the upper and lower electrodes 61 and 63 constituting the pressure-sensitive sensor 60, and the ground electrodes 92 will be schematically shown in FIG. 11. FIG. 11A is an example in which the ground electrodes 92 are arranged adjacently to the upper and lower electrodes 61 and 63. FIG. 11B is an example in which the ground electrodes 92 are arranged such that each of the upper and lower electrodes 61 and 63 is interposed therebetween. FIG. 11C is an example in which the ground electrode 92 is arranged adjacently to the upper electrode 61. This structure corresponds to the structure of FIG. 10. Further, FIG. 11D is an example in which the ground electrode 92 is arranged adjacently to the lower electrode 63. In the structural examples above, the ground electrode 92 is arranged on the same plane on which the upper electrode 61 or the lower electrode 63 is arranged, but is not limited thereto. The ground electrode 92 may be arranged on a plane different from a plane on which the upper and lower electrodes 61 and 63 are arranged.

Heretofore, the embodiments have been described. However, the present application is not limited to the above embodiments and may be variously modified based on the technical idea of the present application.

Figure 12:
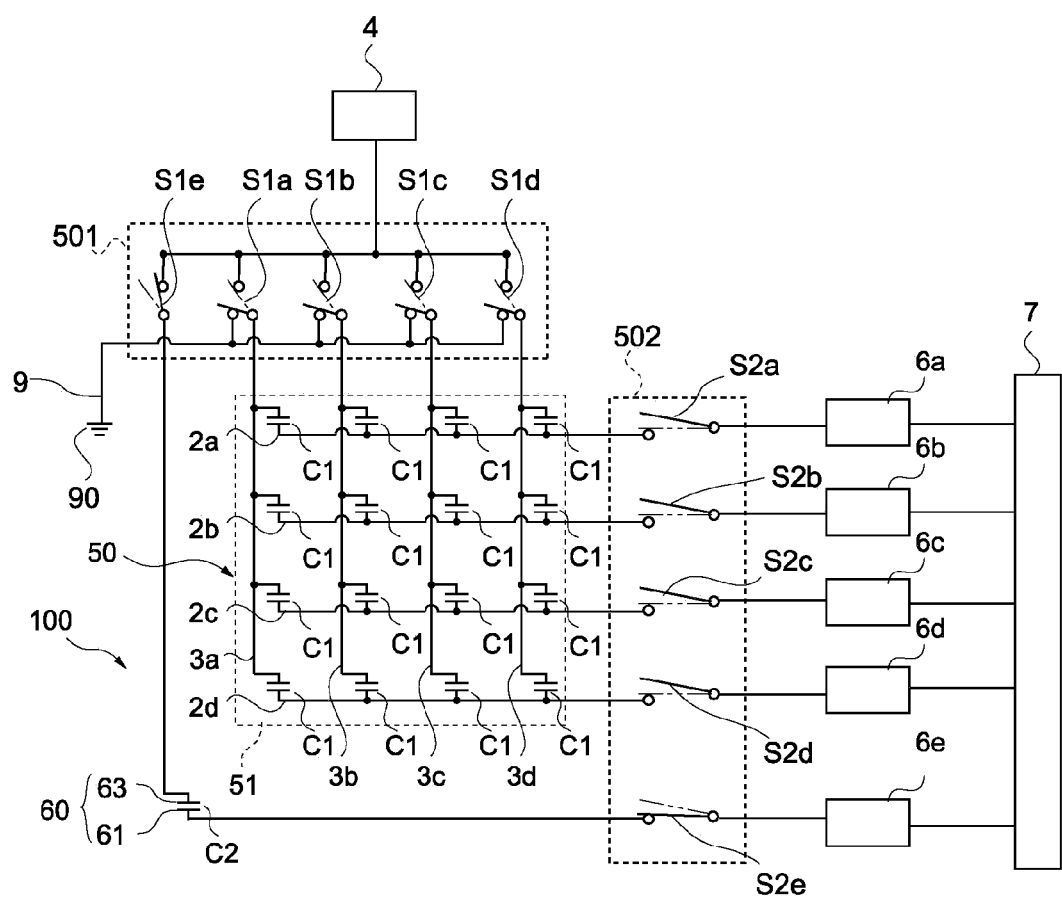
FIG. 12 is a circuit diagram showing another structural example of the sensor apparatus shown in FIG. 7.

For example, in the embodiments described above, the example in which the common detection circuit 6 is provided to the touch panel 50 and the pressure-sensitive sensor 60 has been described, but the present application is not limited thereto. For example, a detection circuit may be provided for each of the X-direction detection electrodes 2a to 2d of the touch panel 50 and the pressure-sensitive sensor 60 as shown in FIG. 12. In this case, circuits having a common structure can be used as detection circuits 6a to 6e, with the result that it is possible to reduce the cost of the apparatus by using common circuit components. It should be noted that in FIG. 12, portions corresponding to those in FIG. 7 are denoted by the same reference symbols and description thereof will be omitted.

Figure 13:
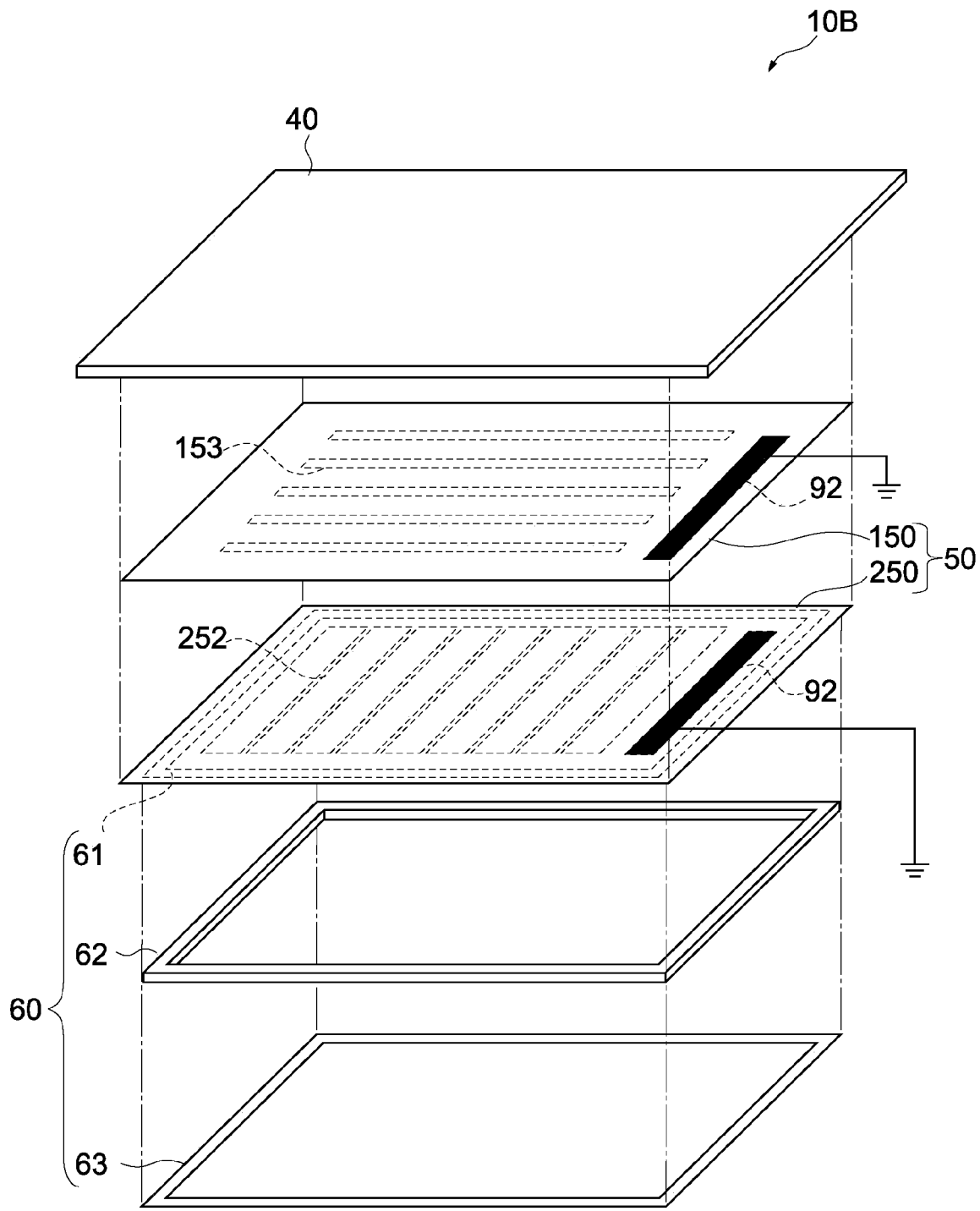
FIG. 13 is an exploded perspective view showing a modified example of the structure of the sensor apparatus shown in FIG. 10.

Next, FIG. 13 is an exploded perspective view schematically showing a modified example of the structure of the sensor apparatus 10A of FIG. 10. In a sensor apparatus 10B shown in FIG. 13, the ground electrodes 92 may be arranged on the X electrode substrate 150 and the Y electrode substrate 250 as shown in FIG. 13. The position, shape, size, and range of the ground electrode 92 are not particularly limited and are set as appropriate in accordance with a magnitude of a capacitance that is necessary as the pressure-sensitive sensor 60.

Figure 14A:
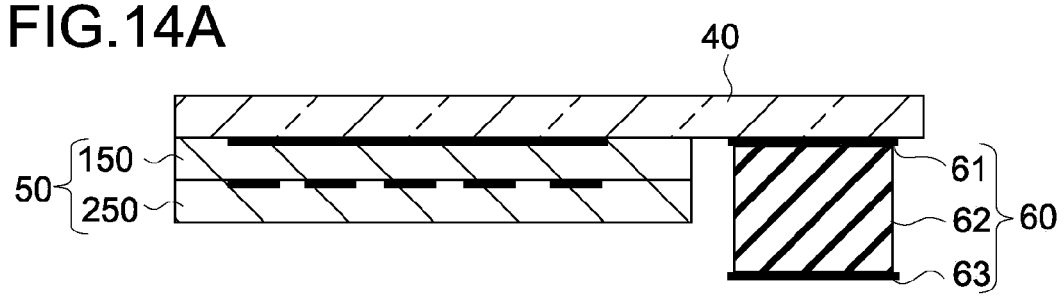
FIG. 14 are cross-sectional side views each showing a modified example of a part of the structure of the sensor apparatus shown in FIG. 4.
Figure 14B:
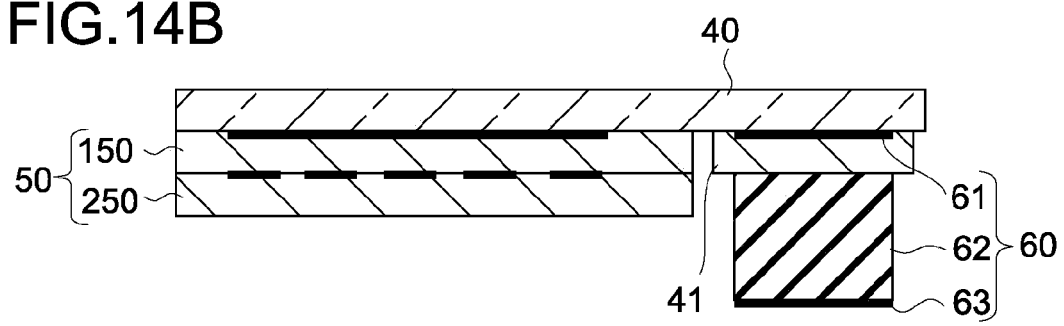

In addition, in the embodiments described above, the pressure-sensitive sensor 60 is arranged immediately below the touch panel 50 as shown in FIG. 4, but the present application is not limited thereto. FIGS. 14A and 14B each show a structural example in which the pressure-sensitive sensor 60 is arranged in the edge portion of the top plate 40 apart from the touch panel 50. The upper electrode 61 of the pressure-sensitive sensor 60 is directly formed on the lower surface of the top plate 40. The example shown in FIG. 14B shows the structure in which an insulating layer 41 is formed between the upper electrode 61 and the elastic body 62. The insulating layer 41 may be a resin substrate constituting the X electrode substrate 150.

Further, in the embodiments described above, as the touch panel 50, the system in which a contact position on the input operation surface 51 is detected based on the capacitance change of the capacitors C1 formed between the X-direction detection electrodes 2a to 2d and the Y-direction detection electrodes 3a to 3d has been described as an example. Instead of this, the present application is also applicable to a touch panel having a system in which a capacitance change caused between X-direction detection electrodes and an operator (finger), and a capacitance change caused between Y-direction detection electrodes and the operator are detected and an input operation position of the operator is detected.

In addition, in the embodiments described above, the sensor apparatus including the touch panel 50 as a first capacitance element and the pressure-sensitive sensor 60 as a second capacitance element has been described as an example, but the present application is not limited thereto. The present application is applicable to a sensor apparatus including two or more capacitance elements having different capacitances. Specifically, the capacitance element can be used not only for a function as a contact sensor (proximity sensor) or a pressure sensor, but also for a range sensor, a thickness sensor, a concentration meter, an accelerometer, or the like. Therefore, the present application is applicable to all sensor apparatuses including a plurality of capacitance elements for different use.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A sensor apparatus, comprising:
a first capacitance element having a first capacitance;
a second capacitance element including a first electrode and a second electrode that form a second capacitance larger than the first capacitance;
a ground circuit including a third electrode arranged adjacently to the first electrode, and converting the second capacitance into a third capacitance smaller than the second capacitance by connecting the third electrode to a ground potential; and
a signal processing circuit to process a first signal output from the first capacitance element based on a change of the first capacitance, and a second signal output from the second capacitance element based on a change of the third capacitance.

2. The sensor apparatus according to claim 1,
wherein the first capacitance element includes an input operation surface operated by an operator,
wherein the first signal includes a signal for detecting a contact position of the operator with respect to the input operation surface, and
wherein the second signal includes a signal for detecting a pressing force of the operator with respect to the input operation surface.

3. The sensor apparatus according to claim 2,
wherein the first capacitance element includes a plurality of first detection electrodes extending in a first direction, and a plurality of second detection electrodes that extend in a second direction crossing the first direction and are opposed to the plurality of first detection electrodes, to thereby form capacitance elements each having the first capacitance, and
wherein the ground circuit includes a switch circuit that forms the third electrode by connecting one of the plurality of first detection electrodes and the plurality of second detection electrodes to the ground potential.

4. The sensor apparatus according to claim 3,
wherein the switch circuit includes
a first switch having a first state in which an input of the first signal to the signal processing circuit is blocked, and
a second switch having a second state in which the second signal is allowed to be input to the signal processing circuit when the first switch is in the first state.

5. The sensor apparatus according to claim 4,
wherein the first switch connects one of the plurality of first detection electrodes and the plurality of second detection electrodes to the ground potential in the first state.

6. The sensor apparatus according to claim 3, further comprising a casing to accommodate the first capacitance element,
wherein the first electrode is fixed to the first capacitance element, and the second electrode is fixed to the casing.

7. The sensor apparatus according to claim 6,
wherein the first electrode is arranged in a circumference of the first capacitance element.

8. The sensor apparatus according to claim 7,
wherein the second capacitance element further includes an elastic member arranged between the first electrode and the second electrode.

9. The sensor apparatus according to claim 2, further comprising a display element to display an image on the input operation surface.

10. An information processing apparatus, comprising:
a first capacitance element including an input operation surface operated by an operator and having a first capacitance;
a second capacitance element including a first electrode and a second electrode, and forming a second capacitance larger than the first capacitance;
a ground circuit including a third electrode arranged adjacently to the first electrode, and converting the second capacitance into a third capacitance smaller than the second capacitance by connecting the third electrode to a ground potential;
a signal processing circuit to process a first signal for detecting a contact position of the operator with respect to the input operation surface and a second signal for detecting a pressing force of the operator with respect to the input operation surface, the first signal being output from the first capacitance element based on a change of the first capacitance, the second signal being output from the second capacitance element based on a change of the third capacitance; and
a display element to display an image on the input operation surface.

* * * * *